(12) United States Patent
Bagherjeiran et al.

(10) Patent No.: US 9,031,863 B2
(45) Date of Patent: May 12, 2015

(54) CONTEXTUAL ADVERTISING WITH USER FEATURES

(75) Inventors: Abraham H. Bagherjeiran, Sunnyvale, CA (US); Andrew O. Hatch, Oakland, CA (US); Adwait Ratnaparkhi, San Jose, CA (US); Amruta S. Joshi, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 336 days.

(21) Appl. No.: 12/806,802

(22) Filed: Aug. 19, 2010

(65) Prior Publication Data

US 2012/0047020 A1 Feb. 23, 2012

(51) Int. Cl.
*G06Q 30/00* (2012.01)
*G06Q 30/02* (2012.01)

(52) U.S. Cl.
CPC ............ *G06Q 30/02* (2013.01); *G06Q 30/0256* (2013.01); *G06Q 30/0251* (2013.01); *G06Q 30/0255* (2013.01); *G06Q 30/0269* (2013.01)

(58) Field of Classification Search
USPC ....................................................... 705/14.66
See application file for complete search history.

(56) References Cited

U.S. PATENT DOCUMENTS

| | | | | |
|---|---|---|---|---|
| 5,848,396 | A * | 12/1998 | Gerace | 705/7.33 |
| 6,182,097 | B1 * | 1/2001 | Hansen et al. | 715/234 |
| 6,757,661 | B1 * | 6/2004 | Blaser et al. | 705/14.54 |
| 6,778,807 | B1 * | 8/2004 | Martino et al. | 434/362 |
| 7,047,242 | B1 * | 5/2006 | Ponte | 1/1 |
| 7,577,665 | B2 * | 8/2009 | Ramer et al. | 1/1 |
| 2006/0282328 | A1 | 12/2006 | Gerace et al. | |
| 2007/0078822 | A1 * | 4/2007 | Cucerzan et al. | 707/3 |
| 2008/0243821 | A1 * | 10/2008 | Delli Santi et al. | 707/5 |

(Continued)

FOREIGN PATENT DOCUMENTS

| | | |
|---|---|---|
| JP | 2007-286833 | 1/2007 |
| JP | 2007-164710 | 6/2007 |
| WO | WO 2007/055812 | 5/2007 |

OTHER PUBLICATIONS

Mimno et al., "Topic Models Conditioned on Arbitrary Features with Dirichlet-multinomial Regression", Conference of the Association for Uncertainty in Artificial Intelligence (UAI) 2008, Helsinki, Finland.*

(Continued)

*Primary Examiner* — John G Weiss
*Assistant Examiner* — Scott C Anderson
(74) *Attorney, Agent, or Firm* — Weaver Austin Villeneuve & Sampson LLP (57) ABSTRACT

Disclosed are apparatus and methods for facilitating contextual selection of advertisements for displaying online via a computer network. In general, user features in the form of text are provided in conjunction with web page content for contextual advertisement matching. In one embodiment, a request for an advertisement to be displayed in a current web page that has been requested by a current user is received. The current user is associated with one or more current user characteristics from a plurality of different user characteristics, and the current web page has an associated content. A mapping model and the one or more current user characteristics are used to obtain a plurality of user-relevant terms for each of the one or more current user characteristics. A combination of the content of the current web page and obtained user-relevant terms are provided for selecting an advertisement for displaying with the current web page based on such combination.

22 Claims, 5 Drawing Sheets

(56) References Cited

U.S. PATENT DOCUMENTS

2010/0082440 A1  4/2010  Vaidyanathan et al.
2010/0169175 A1  7/2010  Koran

OTHER PUBLICATIONS

Tsurumi, "Likelihood", lecture for Econometrics Section 2 course (Econ. 322), Rutgers, The State University of New Jersey, Fall 2005, pp. 1-5. Found on line at econweb.rutgers.edu/tsurumi.*

International Search Report dated Apr. 6, 2012, PCT Application No. PCT/US2011/045386.

TW patent application No. 100128320, Office Action mailed Jul. 7, 2014.

* cited by examiner

CONTEXTUAL ADVERTISING WITH USER FEATURES

BACKGROUND OF THE INVENTION

The present invention relates to online advertising and, in particular, to techniques for selecting advertisements for display in online web pages.

Online Advertising relates to the promoting of products and services using the Internet and World Wide Web. Typical online advertisement types include banner ads, floating ads, pop-up ads, and video ads, which are provided through a browser to the user's computer desktop. A large segment of online advertising is untargeted. Typically, online advertisement strategy involves placing an advertisement on the computer desktop of as many computer users as possible, in the hopes that at least a few computer users will be interested. Such untargeted advertising tends to be inefficient, and may be annoying to many computer users whose computer desktop may seem cluttered with undesired ads or ads, which are uninteresting to the user.

"Contextual advertising" refers to a form of Internet advertising/marketing where advertisements are selected and served by automated systems based on content of the web page the user is viewing. For example, a contextual advertisement selection system may scan the text of a web page for keywords, and select advertisements based on any keywords located in the text. When the web page is displayed for the user, a contextual advertisement selection system provides the selected advertisements for display on the web page.

Regardless of the specific online advertisement type, providers of online advertising services face considerable challenges that relate to the increasing tendency of users to ignore advertisement content. A provider typically strives to achieve a balance between presenting advertisements which are sufficiently eye-catching to result in revenue, but which are not so intrusive that they negatively impact user experience. For example, a contextual advertisement methodology may result in inappropriate advertisements being inadvertently placed with respect to content, such as an airline advertisement that is selected for display with a news article about an airplane crash

SUMMARY OF THE INVENTION

Accordingly, apparatus and methods for facilitating contextual selection of advertisements for displaying online via a computer network are provided. In general, user features in the form of text are provided in conjunction with web page content for contextual advertisement matching. In one embodiment, a request for an advertisement to be displayed in a current web page that has been requested by a current user is received. The current user is associated with one or more current user characteristics from a plurality of different user characteristics, wherein the current web page has an associated content. A mapping model and the one or more current user characteristics are used to obtain a plurality of user-relevant terms for each of the one or more current user characteristics. A combination of the content of the current web page and obtained user-relevant terms are provided for selecting an advertisement for displaying with the current web page based on such combination.

In a specific implementation, the different user characteristics comprise a plurality of different user categories that relate to user interest or expertise in such different user categories and/or a plurality of different user demographics. In a further aspect. Each of the plurality of different user characteristics is mapped to a plurality of user-relevant terms that are also relevant for contextual advertisement selection to generate one or more mapping models. In one embodiment, the mapping is based on collected user activity information. For example, the user activity information comprises a plurality of specified activity categories for different activities, a plurality of specified web pages that have been selected by a plurality of users, and a plurality of terms from the specified web pages.

In one implementation, the mapping comprises learning the mapping model based on the terms from the specified web pages and the specified activity categories. In a further aspect, this learning comprises using a regression technique and one or more topic models. In another aspect, the terms are extracted from the specified web pages that are relevant for advertisement selection. In a specific example, the learning comprises maximizing a likelihood function based on the specified web pages and the specified activity categories.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of embodiments of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that they are not intended to limit the invention to these specific embodiments. On the contrary, such description is intended to cover alternatives, modifications, and equivalents as may be included within the spirit and scope of the invention as defined by the appended claims. In the following description, numerous specific details are set forth in order to provide a thorough understanding of embodiments of the present invention. Embodiments of the present invention may be practiced without some or all of these specific details. In other instances, well known process operations have not been described in detail in order not to unnecessarily obscure embodiments of the present invention.

For many web portals and Internet Service Providers (ISPs), advertising is a major source of revenue. One form of advertising involves showing advertisement banners on web sites as they are being visited by users. For example, a preeminent portal such as Yahoo! displays advertisements on one or more associated web sites that are viewed by users. In return, the advertisers pay a fee for each advertisement or a predefined number of advertisements viewed by web users. Contracts to show advertisements are normally signed several weeks or months before advertisements get delivered and are often expressed in terms of page views. The duration of contracts typically ranges from one day to multiple years.

Figure 1:
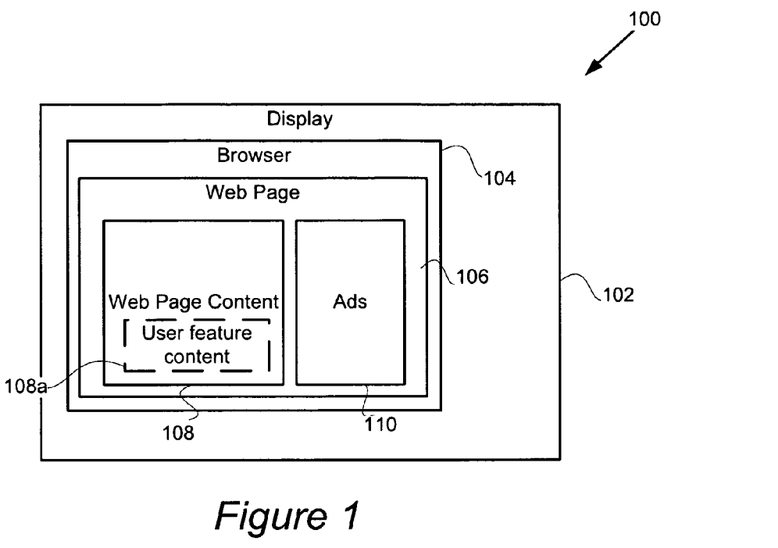
FIG. 1 shows advertisements in a contextual advertising environment in accordance with one example embodiment.

FIG. 1 shows advertisements in a contextual advertising environment 100 in accordance with one example embodiment. In this example, a browser window 104 is open within display 102. The user may cause web page 106 to be displayed in this browser window 104 using any suitable technique, including navigating to web page 106 according to a URL (uniform resource locator) address for web page 106 or selecting the web page as a search result.

In general, mechanisms for selecting advertisements based on contextual content of both web pages and user features are provided herein. User features are generally mapped to textual content 108a and provided along with the web page content 108 of the display web page 106 to a contextual ad system. The web page content 108 may then be analyzed together with user feature content 108a so as to determine the appropriate one or more advertisements 110 to display with the requested web page 106. In other words, different advertisements can be selected for two different users, who have different user features, requesting the same web page. User feature information is mapped into a format that is usable by a content analyzer for selecting one or more advertisements. After content analysis of the requested web page and user feature content is performed, the displayed web page 106 may then include any number and arrangement of selected advertisements 110. Selected advertisements 110 may be displayed according to any suitable format, including banner ads, floating ads, pop-up ads, and video ads.

In one embodiment, advertisement-relevant text for one or more user features is learned based on historical user activities. This learned advertisement-relevant text for one or more user features may then be analyzed together with the advertisement-relevant text of a particular web page's content so as to select a particular advertisement for displaying with the particular web page's content.

In certain cases, the text based on user features may be more relevant to ad selection than the web page's content. In certain web pages, text content is not relevant for advertisement selection. For instance, a game playing site will likely have text pertaining to a particular game, and one would not want to select advertisements pertaining to the same game. In this case, only the text for the user features may be analyzed for ad selection. In other cases, it may be preferable to analyze only the text from the web page's content for ad selection.

Figure 2:
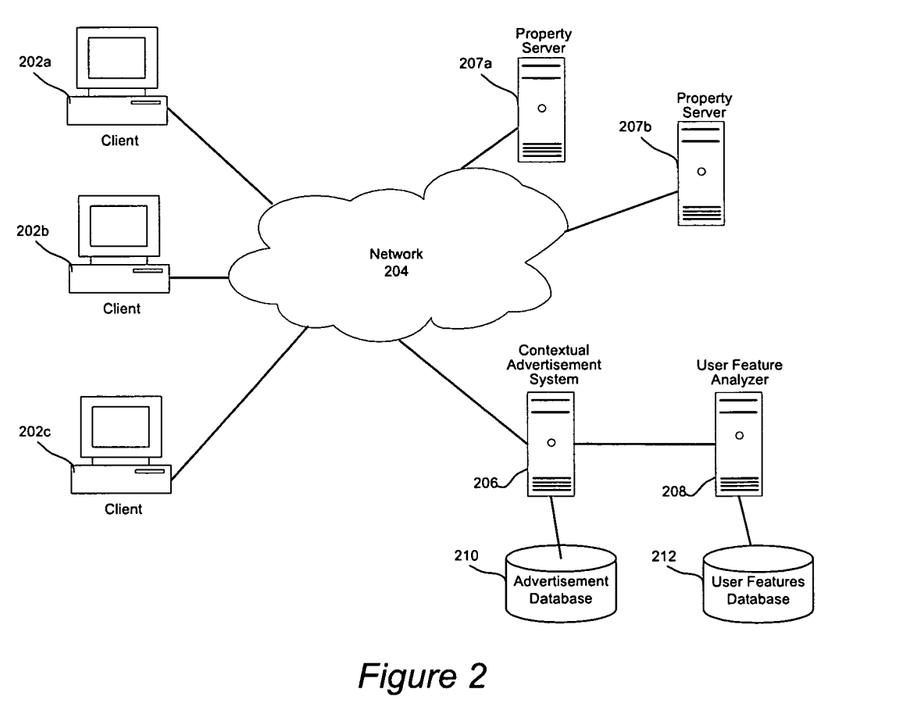
FIG. 2 illustrates an example network segment in which the present invention may be implemented in accordance with one embodiment of the present invention.

Prior to describing techniques for selecting advertisements for a web page, a computer network architecture will first be briefly described to provide an example context for practicing techniques of the present invention. FIG. 2 illustrates an example network segment 200 in which the present invention may be implemented in accordance with one embodiment of the present invention. As shown, a plurality of clients 202a-c may access one or more web property applications, for example, on property servers 207a and 207b via network 204 and/or access an advertisement service, for example, on contextual advertisement system 206.

The network may take any suitable form, such as a wide area network or Internet and/or one or more local area networks (LAN's). The network 204 may include any suitable number and type of devices, e.g., routers and switches, for forwarding web property requests from each client to each web property server and forwarding web property results back to the requesting clients, forwarding ad negotiation data between specific clients and contextual ad system 206, or for forwarding data between various servers or systems.

The invention may also be practiced in a wide variety of network environments (represented by network 204) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Each web property application may implement any type of web service that is provided by a particular service provider (e.g., Yahoo! Inc. of Sunnyvale, Calif.), such as Yahoo! Answers, Yahoo! Autos, Yahoo! Finance, Yahoo! Games, Yahoo! Groups, Yahoo! HotJobs, Yahoo! Maps, Yahoo! Movies/TV, Yahoo! Music, Yahoo! Personals, Yahoo! Real Estate, Yahoo Shopping, Yahoo! Sports, Yahoo! Travel, Yahoo! Yellow Pages, Yahoo! Local, Yahoo! Search, Yahoo! Email, etc. Each property application may be utilized by a user (human or automated), e.g., on clients 202a-202c.

Each web property may facilitate access to any suitable number and type of web pages. For example, a user of client 202c who desires to view a web page may submit a request to a particular web property 207a through network 204. The request may be in any suitable form, such as a clicked link or URL address entered into a web browser. The property server 207a may receive the request and transmit a web page corresponding to content request back to client 202c to be viewed by the user at client 202c.

Advertisement salespeople who sell contracts to advertisers may interact with contextual advertisement system 206 (e.g., via client 202a and through network 204). In one embodiment, a salesperson may issue a query to contextual advertisement system 206 regarding a specified product or target. For example, the product may be specified by particular content or "advertisement words" or "keywords" that can be found in served web pages.

Alternatively, the product may be automatically specified based on ad text. Regardless of the origin of the specified product, the contextual advertisement system 206 may also be configured to obtain a price for a specified product, obtain inventory availability information, and return the available inventory information and price to a querying salesperson (e.g., to client 202a via network 204). The salesperson may then book a contract accordingly (e.g., via contextual advertisement system 206 via network 204). The contextual advertisement system 206 then operates to fill the booking by providing the number of requested impressions (e.g., via a property server) at the negotiated price during the contract period.

As described herein, one or more advertisements (e.g., 110) may be displayed in a particular web page (106) based on such web page's content and advertisement contracts for specified content. One or more advertisements may be selected by contextual advertisement system 206 based on contracts with an advertiser for specified contextual content. For instance, a property server (e.g., 207*a*) may provide the textual content (108), which includes the content of the selected page and one or more characteristics of the requesting user, to contextual advertisement system 206.

Contextual advertisement system 206 may search or scan the textual content 108 of the selected web page, including the user feature content 108*a*, for keywords, and select an advertisement from an advertisement database based on any located keywords and the contracts made with specific advertisers for such keywords. Contextual advertisement system 206 may then select one or more advertisements based on content 108, including user feature content 108*a*. The selected one or more advertisements are then provided to the property server (or directly to the client device) to be included in the web page provided to the client device of the user in response to web page request.

The contextual advertisement system 206 may access any number and type of databases (e.g., advertisement database 210) for facilitating advertisement functions. For instance, advertisement database 210 may be used to store contractual information, advertisement content, advertisement selection models, etc.

The network may also include a user feature analyzer 208 for analyzing user feature data, e.g., as stored in user features database 212. User features data may include user profiles, search information, web page viewing/selection information, advertisement viewing/selection information, etc. as compiled over predetermined time periods. The user feature analyzer 208 may use this historical data to learn mapping models for mapping user profile information to contextual information, click models for selection of advertisements based on contextual information, pricing models for pricing specified products, etc., which may also be stored in user feature database 212.

The advertisement system may perform all of the analysis for selecting advertisements for specific selected web pages; the user feature analyzer 208 may perform all the analysis with respect to user historical activities; and the individual property servers may serve web pages. Alternatively, any number or portion of these processes may be shared by any of these systems. Alternatively, the advertisement, behavior analysis, and serving features may be integrated together. Embodiments of the present invention may be employed with respect to any provider of one or more web property applications and advertisement system, and example providers include Yahoo! Inc., Google Inc., Microsoft Corp., etc. A plurality of web property applications and advertisement system may be implemented on any number of servers although only one advertisement system 206 and two web property servers 207*a* and 207*b* are illustrated for clarity and simplification of the description.

Figure 3:
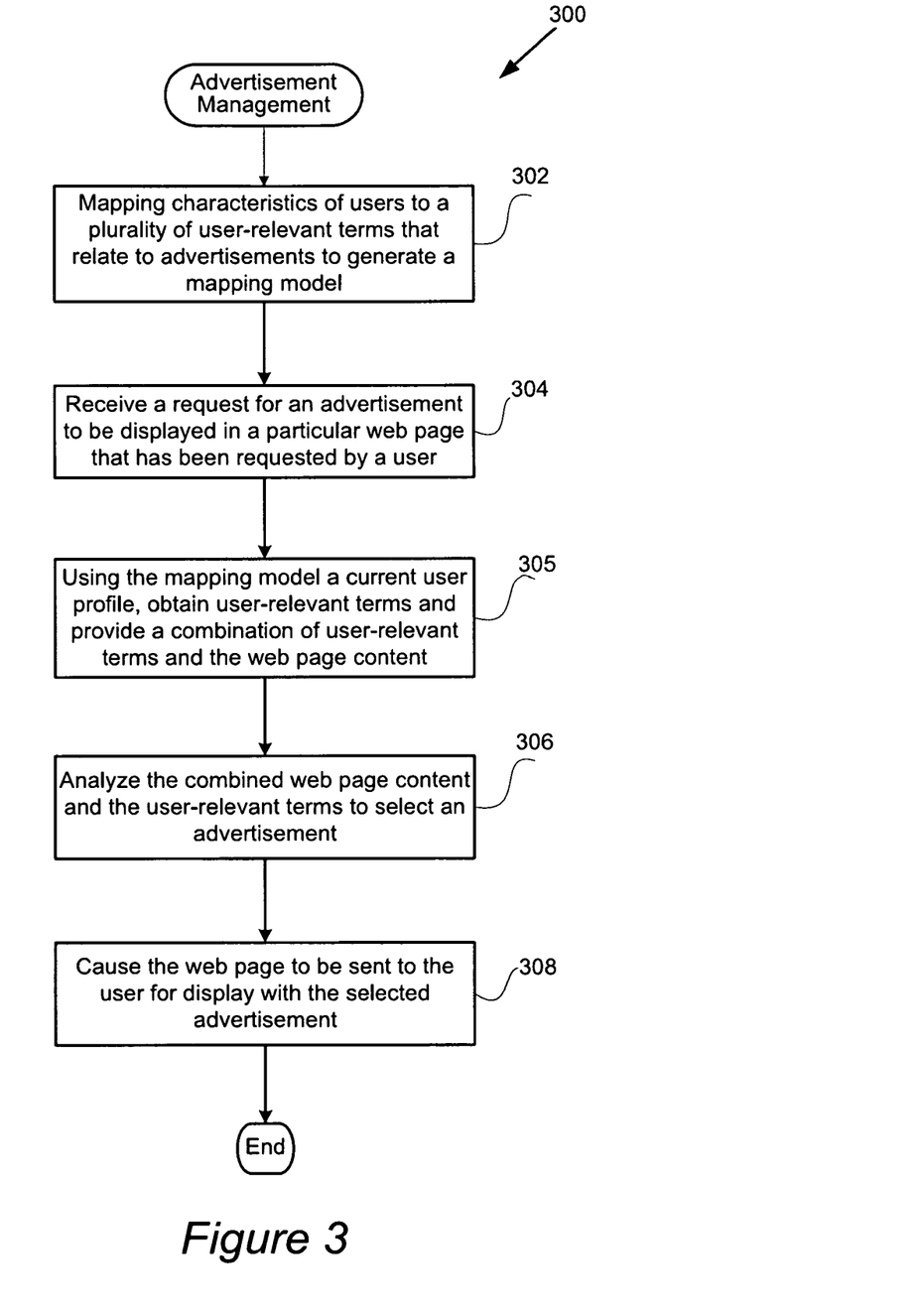
FIG. 3 is a flow chart illustrating a procedure for advertisement management in accordance with one embodiment of the present invention.
Figure 4:
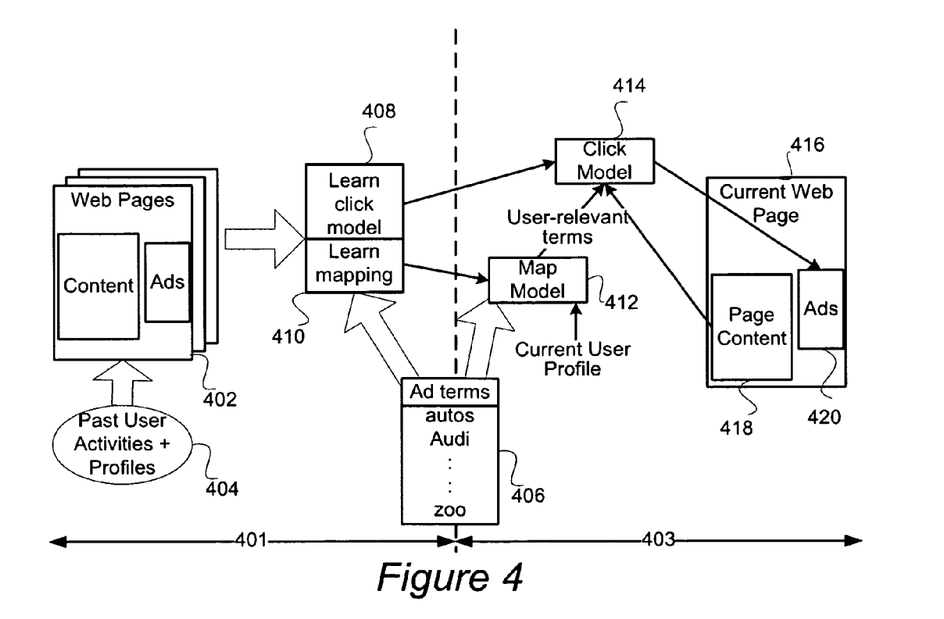
FIG. 4 is a diagrammatic representation of a contextual advertisement system in accordance with one embodiment of the present invention.

FIG. 3 is a flow chart illustrating a procedure for advertisement management in accordance with one embodiment of the present invention. Initially, one or more characteristics of users are mapped to a plurality of user relevant terms that relate to advertisements, for example, to generate a mapping model, in operation 302. Throughout this description, a "term" can refer to any suitable textual feature, such as one or more words or phrases. As shown in FIG. 4, past user activities and profiles 404 with respect to selected and viewed web pages 402 and a list of advertisement terms or keywords 406 are provided. A mapping between user features or profiles and advertisement terms is then learned (410) based on analysis of such historical information, and this mapping may result in one or more mapping models (e.g., 412). In a specific implementation, a user's profile indicates one or more specific categories in which the user is deemed to be interested or have expertise, and these categories can be mapped by a mapping model 412 to a set of advertisement terms (e.g., a subset of the predetermined and complete advertisement term list 406). Other user feature information, such as user demographics, may also be mapped to the ad terms.

Referring back to the example process of FIG. 3, a request for an advertisement to be displayed in a particular web page that has been requested or selected by a user may then be received in operation 304. For example, a user may have performed a search with a particular search server and then selected a particular search result. In another example, a user may access and view one or more web pages from a particular property. Additionally, the search server (or other property server) may have sent an advertisement request for the selected search result to a contextual advertisement system. As illustrated in FIG. 4, a current web page 416 is being accessed by a particular user.

Using one or more mapping models 412 and current user profile, user-relevant terms may be obtained and provide a combination of the user-relevant terms and the current web page's content (e.g., to a contextual advertisement system) in operation 305. The current user profile may pertain to a user category. Behavior targeting algorithms may be used to output categories that are relevant for specific users. Each category typically represents the particular user's interest or expertise in the category. The current user profile may also include user demographics, such as age, gender, occupation, educational level, salary, etc.

As shown in FIG. 4, one or more mapping models 412 can be used to map the current user profile to a set of user-relevant terms from advertisement list 406. The combined web page content and user-relevant terms may then be analyzed to select an advertisement (or set of advertisements) in operation 306. For instance, a click model 414, as learned (408) based on user historical information (404 and 402), may be used to select the most appropriate advertisement 420 based on the user-relevant terms and current page content 418. The web page, including its current page content 418, can then be caused to be sent to the user for display with the selected advertisement (420) in operation 308. The advertisement management process 300 then ends. However, this process for selecting an advertisement may be repeated for any number and type of web pages and user profiles.

Figure 5:
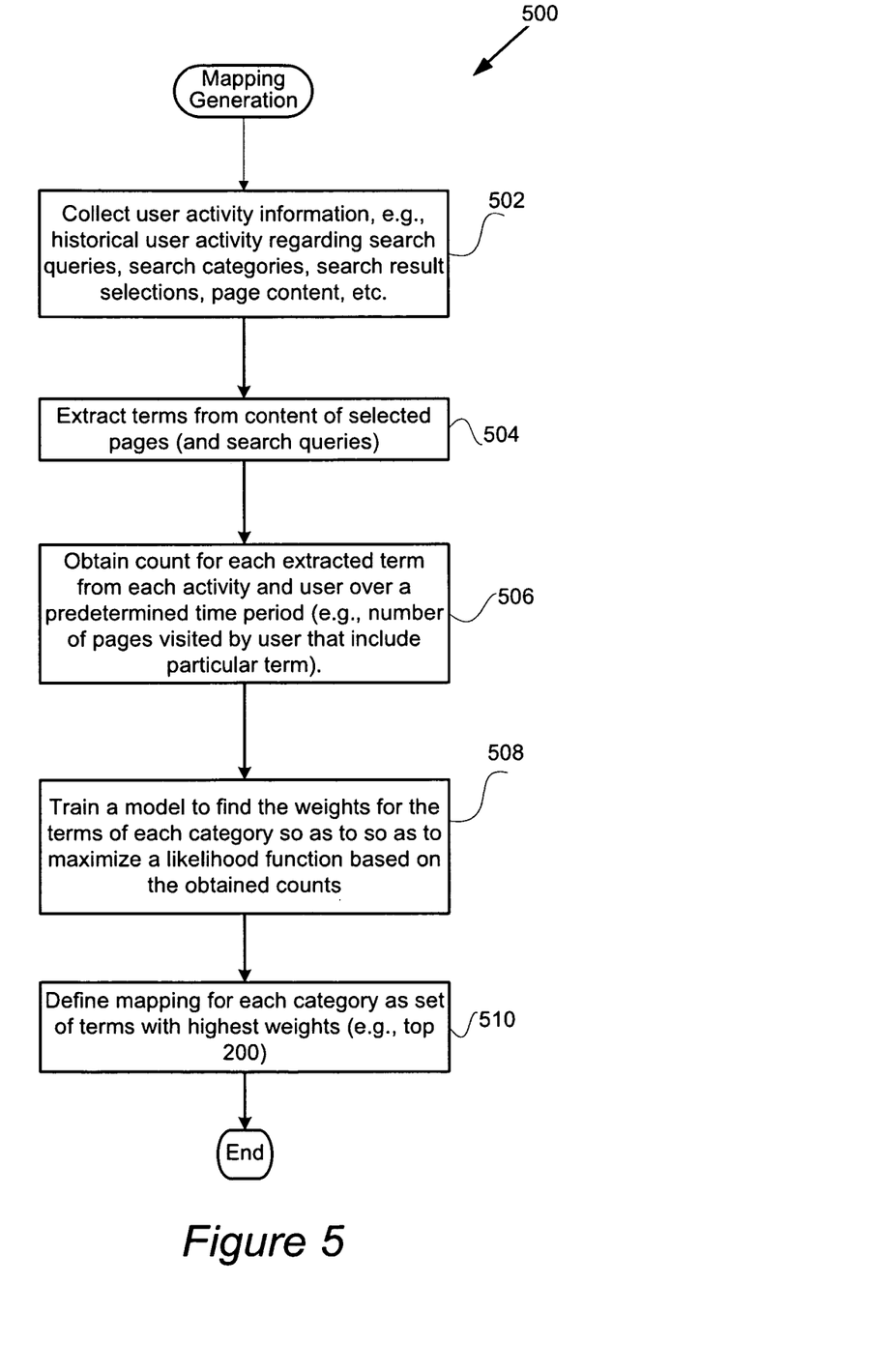
FIG. 5 is a flow chart illustrating a mapping process in accordance with a specific implementation of the present invention.

FIG. 5 is a flow chart illustrating a mapping process 500 in accordance with a specific implementation of the present invention. In general, mapping is learned over observed features so as to annotate users with text when their text cannot be observed. In one implementation, a simple topic model can be generated for each user. Initially, historical user activity information is collected in operation 502. The user activity information generally relates to user browsing activities. For example, historical user activity may be collected and stored for predefined time periods, and this user activity information may include information on user visits to web pages, user search query information, user search results selection information, page content, advertisement views and clicks, etc. A category is also associated with each search query in any suitable manner, such as manual or semi-supervised, supervised classification.

Terms from the content of selected pages may be extracted in operation 504. Terms may also be extracted from the search queries (or other user activity types) themselves. Additionally, terms may be extracted from web pages or advertisements visited by users, etc. That is, the source of the extracted text may be from any number and type of user events. Text may be extracted using any suitable techniques. One or more feature extraction operators may output textual features, such as any combination of the following types:

Stemmed unigrams, using porter stemming.
Phrases that match search queries in the past.
Phrases that match a phrase that is bidded on by some advertiser in the past.
Features of the web page URL (uniform resource locator), in the case of pages such as the hostname of the page.

Terms may then be aggregated with a decayed sum resulting in the tag cloud representation as follows:

$$F_u(u) = \sum_{\tau=1}^{n} F_u(u; \tau) \delta^{\tau}$$

$$F(u; \tau) = \sum_{e \in e_\tau} F_{Type(e)}(e)$$

F corresponds to feature extraction operators for each user (u), which is implemented over n time periods denoted by $\Gamma$ and $e_\Gamma$ indicates the set of user events for which user features are extracted during time period $\Gamma$, such as a search or a visit to a web page. For example, n=30 and is $\Gamma$ one day. Additionally, $\delta$ is a decay factor that can be chosen to be greater than zero and less than or equal to 1 and that can represent the marginal contribution of one day to the user's history. The smaller the decay, the more the past is discounted. A decayed sum may be implemented by the following recurrence formula, which can be computed incrementally without storing the event-level history of each user:

$$F_u(u) = F_u(u;) + \delta F(u; \pi - 1)$$

Thus, a set of terms may be obtained over time for a number of users and particular event types. These extracted terms are relevant to advertisements. For example, the extracted terms are the same terms that can be extracted from the advertisements or are deemed to be relevant by the advertisers.

A count for each extracted term during the search activities (or other type of activities) for each user may be obtained over the predetermined time period (e.g., 1 month) in operation 506. For example, the number of visited pages that include a particular term visited by the user may be summed. A sequence of records (e.g., user X, category c, terms) for each user may be compiled and stored. That is, each identified user (e.g., X) may be associated and recorded with the search query category and a list of extracted terms and their corresponding counts or weights.

A model to find the weights for the terms of each category may be trained so as to maximize a likelihood function based on the obtained counts in operation 508. In a specific implementation, a machine learning classifier, such as a logistic regression model, is trained to find the weights for the terms for each category. Mapping for each category can then be defined as the set of terms with the highest weights (e.g., top 200) in operation 510.

In one specific implementation, a probability for each category is learned with respect to the terms. For instance, it is determined which category is most likely relevant for a given term. The probability for each category and user can be modeled by the following:

$$P(c_i | u) = \frac{1}{Z} \prod_j \alpha_{i,j}^{t_j}$$

$$Z = \sum_k \prod_j \alpha_{i,j}^{t_j}$$

Each, $\alpha_{i,j}^{t_j}$, is the contribution of term $t_j$ to specific category, $c_i$. There are a total of advertisement-relevant terms, j. The maximum likelihood parameters, $\alpha$, for a specific category are those weights that result in a probability function that most closely matches a likelihood determination based on the historical data counts for such category. For example, if a particular term has a large weight for a particular category, any user who issues a search query (or alternatively, another type of activity) in the particular category has been found to likely view a web page having such particular term. In other words, it is determined which term weight values (e.g., top 200 weights) most closely represent the historical data. These terms are then mapped to the particular category.

These semi-supervised topic model can be extremely simple to implement at large scale. It is very easy to interpret because the topics have already been defined. For example, for the category "Motorcycles", the most likely terms can be brands, such as "kawaski" and "yamaha".

In addition (or alternatively) to mapping user categories to specific terms, user demographic information may also be mapped to specific terms (and considered by click models to select one or more advertisements). User demographics values are non-textual values, such as male/female, age range as a number, the user location, etc. For each of these, a corresponding text-based feature may be generated. For example, the following text features may be generated:

Text features for user gender, $F_g$
Text features for user age, $F_a$
Text features for user location, $F_1$ In one embodiment, advertising click logs may be mined in any suitable manner to generate text features for user demographics. To generate a first dataset of candidate text features, for every advertisement click event in the advertising click log, the user's age, gender, location, and the corresponding advertisement bid phrases that represent the general topic of the advertisement may be recorded. Thus, a set of potential mappings from non-textual user demographic features to text-based advertisement bid phrases is obtained.

This list of (user feature-text phrases) mappings may then be mined for the strongest associations among them. Support threshold based filtering to remove mappings with low support may then be performed. A point-wise mutual information may then be calculated in every (user feature-ad phrase) combination so as to rank the most strongly associated pairs. The following Table I shows examples of (user feature-ad phrase) pairs obtained from such association mining.

TABLE I

EXAMPLES OF USER FEATURES ASSOCIATED WITH AD PHRASES.

Age sensitive pairs age range (15-25) - animation training
age range (15-25)- animation classes
age range (25-50) - 1040 child tax credit
age range (15-35) - education loans
age range (15-40)- rental housing
age range (35-55) - refinance your mortgage TABLE I-continued

EXAMPLES OF USER FEATURES
ASSOCIATED WITH AD PHRASES.

age range (35-65+) - actively managed ETFs
age range (60+) - medical supplies
Gender sensitive pairs Female - zucchini bread recipe
Female - neostrata skin product
Female - beauty supplies
Female - apparel and jewellery
Male - workout bar
Male - ford motor co
Male - lakers basketball
Male - automotives To generate a second dataset of text phrases, for every ad click event in the advertising click log, the user's age, gender, location, and the corresponding ad category specified as a node in the ad taxonomy may be recorded. Each ad category can be mapped to a set of text phrases that are commonly associated with it, providing an ample textual description of each ad category.

Using similar association mining for ad categories, a list of the most strongly associated (user feature-ad category) pairs may be obtained. The user categories can be further expanded to text using the text phrases associated with each category and weighted by the strength of the association.

Using these text phrase associations for user demographics, for each user u, a weighted text representation or tag cloud may be created based on the user's gender ($F_g$), user's age ($F_a$), and user's location ($F_l$) by way of examples. These text features for demographics may be combined with text features for a category.

Using the above described user mappings, textual advertisements can be tailored to the specific interests and/or characteristics of the user. Additionally, user-specific and page-specific ad matching can be controlled. For instance, the ad matching may be based on weighted user or page text contributions so as to control the proportion of text types that affect the ad selection process for any suitable purpose.

Figure 6:
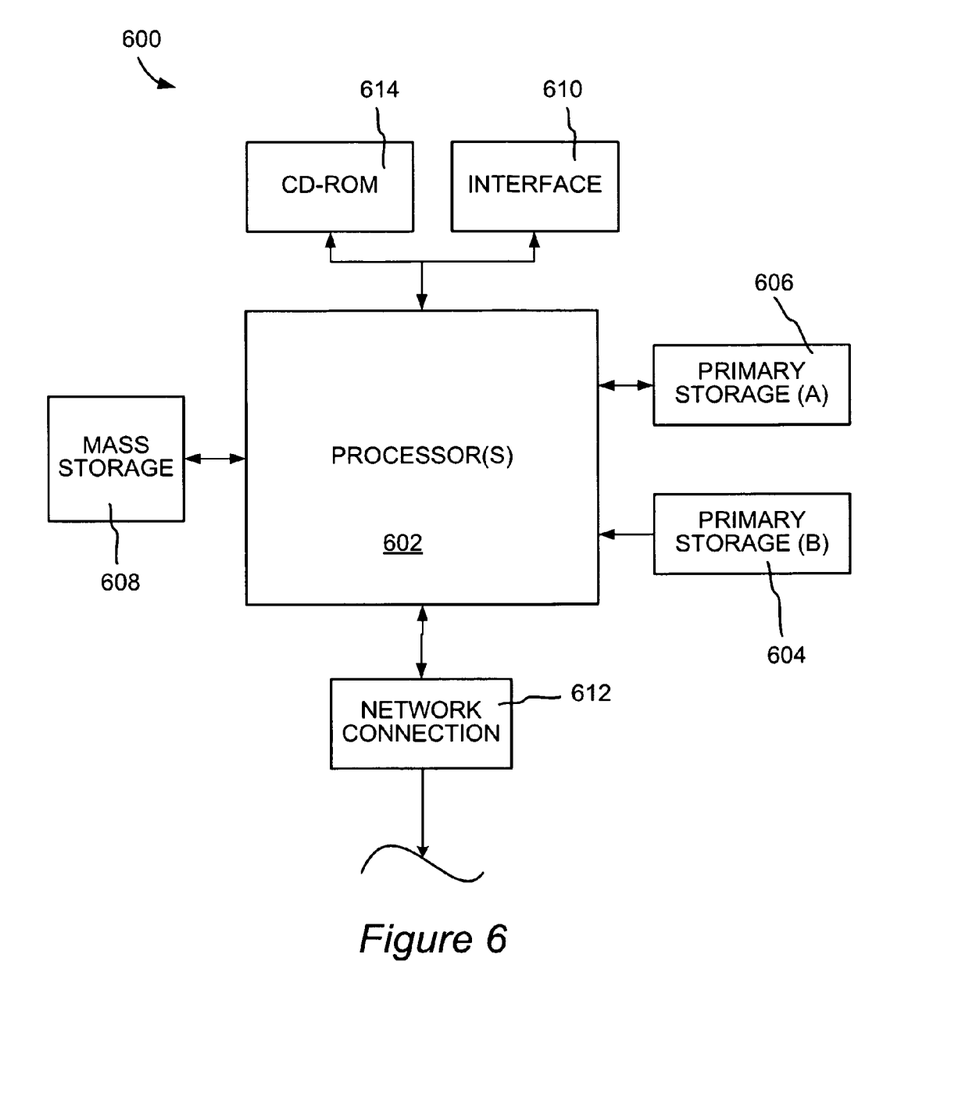
FIG. 6 illustrates an example computer system in which specific embodiments of the present invention may be implemented.

FIG. 6 illustrates a typical computer system that, when appropriately configured or designed, can serve as a contextual advertisement system. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general-purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described herein. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store web page content, historical user information, extracted terms and counts, weights, categories, click models, mapping models, current user profile information, user-relevant terms, advertisements, advertisement content and terms, new impression target information, booking prices, booking duration, number of impressions for each booking, supply and demand information, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Although mappings between terms and user categories and/or demographics have been described, any suitable user activity or characteristic may be mapped to ad-relevant terms. Therefore, the present embodiments are to be considered as illustrative and not restrictive and the invention is not to be limited to the details given herein, but may be modified within the scope and equivalents of the appended claims.

What is claimed is:

1. A computer-implemented method, comprising:
collecting user activity information for a plurality of users, wherein the user activity information that has been collected for the plurality of users includes at least one of web pages that have been viewed by the plurality of users, content of the web pages that have been viewed by the plurality of users, advertisements that have been clicked on by the plurality of users, or user search results that have been selected by the plurality of users;

generating by a processor a mapping model, wherein generating a mapping model includes mapping each one of a plurality of different user characteristics to a corresponding set of terms based, at least in part, on the user activity information that has been collected for the plurality of users and user profiles of the plurality of users, wherein each set of terms include advertisement terms that are a subset of an advertisement term list, the advertisement term list being separate from the user profiles, wherein the plurality of different user characteristics include a plurality of different categories that represent user interest or expertise in such different categories and/or a plurality of different user demographics;

receiving a request for an advertisement to be displayed in a web page that has been requested by a user, wherein the user is associated with one or more user characteristics from the plurality of different user characteristics, the one or more user characteristics including one of the plurality of categories and/or one of the plurality of different user demographics, the one or more user characteristics being indicated by one of the user profiles;

using the mapping model, for each one of the one or more user characteristics of the user, obtaining the corresponding set of terms; and providing the obtained terms for selecting one of a plurality of advertisements for displaying via the web page, wherein the advertisement term list is separate from the plurality of advertisements.

2. The method as recited in claim 1, wherein the plurality of different user characteristics comprise the plurality of different user demographics, wherein the plurality of different user demographics comprise a plurality of age ranges or genders including female and male, and wherein the one or more user characteristics of the user include one or more of the plurality of different user demographics.

3. The method of claim 1, wherein the user activity information comprises a plurality of web pages that have been selected by the plurality of users.

4. The method of claim 3, wherein the mapping is performed based, at least in part, on a plurality of terms from the plurality of web pages.

5. The method of claim 1, wherein the mapping is performed using a regression technique and one or more topic models.

6. The method of claim 4, further comprising extracting the plurality of terms from the plurality of web pages.

7. The method of claim 1, wherein the mapping comprises maximizing a likelihood function.

8. The method of claim 1, further comprising:
selecting one of the plurality of advertisements based, at least in part, upon the obtained terms; and
providing the selected one of the plurality of advertisements with the web page.

9. The method of claim 1, further comprising:
selecting one of the plurality of advertisements based upon a combination of the obtained terms and content of the web page; and
providing the selected one of the plurality of advertisements with the web page.

10. The method of claim 1, wherein the plurality of user characteristics comprise the plurality of different categories, the method further comprising:
ascertaining, for the user, one or more of the plurality of categories that represent user interest or expertise of the user in such categories, wherein the one or more user characteristics include the one or more of the plurality of categories.

11. The method of claim 1, wherein the advertisement term list is a predetermined list.

12. The method of claim 2, wherein the plurality of user characteristics comprise the plurality of different categories, the method further comprising:
ascertaining, for the user, one or more of the plurality of categories that represent user interest or expertise of the user in such categories, wherein the one or more user characteristics include the one or more of the plurality of categories.

13. An apparatus comprising at least a processor and a memory, wherein the processor and/or memory are configured to perform the following operations:
collecting user activity information for a plurality of users, wherein the user activity information that has been collected for the plurality of users includes a plurality of web pages that have been selected by the plurality of users;

generating by a processor a mapping model, wherein generating a mapping model includes mapping each one of a plurality of different user characteristics to a corresponding set of terms based, at least in part, on the user activity information that has been collected for the plurality of users and user profiles of the plurality of users, wherein each set of terms include advertisement terms that are a subset of an advertisement term list, the advertisement term list being separate from the user profiles, wherein the plurality of different user characteristics include a plurality of different categories that represent user interest or expertise in such different categories and/or a plurality of different user demographics;

receiving a request for an advertisement to be displayed in a web page that has been requested by a user, wherein the user is associated with one or more user characteristics from the plurality of different user characteristics, the one or more user characteristics including one of the plurality of categories and/or one of the plurality of different user demographics, the one or more user characteristics being indicated by one of the user profiles;

using the mapping model, for each one of the one or more user characteristics of the user, obtaining the corresponding set of terms; and providing the obtained terms for selection of one of a plurality of advertisements for displaying via the web page, the advertisement term list being separate from the plurality of advertisements.

14. The apparatus of claim 13, wherein the mapping comprises learning the mapping model based, at least in part, on a plurality of terms from the plurality of web pages.

15. The apparatus of claim 13, wherein the mapping comprises maximizing a likelihood function.

16. The apparatus of claim 13, wherein the plurality of user characteristics comprise the plurality of different categories, wherein each of the plurality of categories corresponds to one of a plurality of ad categories.

17. The apparatus of claim 13, wherein the plurality of different user characteristics comprise the plurality of different user demographics, wherein the plurality of different user demographics comprise a plurality of age ranges or genders including female and male, and wherein the one or more user characteristics of the user include one or more of the plurality of different user demographics.

18. At least one non-transitory computer readable storage medium having computer program instructions stored thereon that are arranged to perform the following operations:
collecting user activity information for a plurality of users, wherein the user activity information that has been collected for the plurality of users includes a plurality of web pages that have been selected by the plurality of users;

generating by a processor a mapping model, wherein generating a mapping model includes mapping each one of a plurality of different user characteristics to a corresponding set of terms based, at least in part, on the user activity information that has been collected for the plurality of users and user profiles of the plurality of users, wherein each set of terms include advertisement terms that are a subset of an advertisement term list, the advertisement term list being separate from the user profiles, wherein the plurality of different user characteristics include a plurality of different categories that represent user interest or expertise in such different categories and/or a plurality of different user demographics;

receiving a request for an advertisement to be displayed in a web page that has been requested by a user, wherein the user is associated with one or more user characteristics from the plurality of different user characteristics, the one or more user characteristics including one of the plurality of categories and/or one of the plurality of different user demographics, the one or more user characteristics being indicated by one of the user profiles;

using the mapping model, for each one of the one or more user characteristics of the user, obtaining a corresponding set of terms; and providing the obtained terms for selection of one of a plurality of advertisements for displaying via the web page, the advertisement term list being separate from the plurality of advertisements.

19. The at least one computer readable storage medium of claim 18, wherein the mapping comprises learning the mapping model based, at least in part, on a plurality of terms from the plurality of web pages.

20. The at least one computer readable storage medium of claim 18, wherein the mapping comprises maximizing a likelihood function.

21. The at least one computer readable storage medium of claim 19, wherein the computer program instructions stored thereon are further arranged to perform the following operation:
   extracting the plurality of terms from the specified web pages.

22. The at least one computer readable storage medium of claim 18, wherein the plurality of different user characteristics comprise the plurality of different user demographics, wherein the plurality of different user demographics comprise a plurality of age ranges or genders including female and male, and wherein the one or more user characteristics of the user include one or more of the plurality of different user demographics.

* * * * *